United States Patent
Zhi-Peng et al.

[11] Patent Number: 5,857,666
[45] Date of Patent: Jan. 12, 1999

[54] SPRING PLATES OF MULTIPLE DISK FRICTION COUPLING DEVICE

[75] Inventors: Han Zhi-Peng; Shigeki Tasaka, both of Chitose, Japan

[73] Assignee: Dynax Corporation, Hokkaido, Japan

[21] Appl. No.: 871,473

[22] Filed: Jun. 9, 1997

[30] Foreign Application Priority Data

Jun. 10, 1996 [JP] Japan .................................... 8-168722

[51] Int. Cl.⁶ ......................................................... F16F 1/20
[52] U.S. Cl. ........................................... 267/161; 267/164
[58] Field of Search ..................................... 267/161, 162

[56] References Cited

U.S. PATENT DOCUMENTS

| | | | |
|---|---|---|---|
| 2,675,225 | 4/1954 | Migny | 267/162 |
| 3,830,477 | 8/1974 | Buchsteiner | 267/161 |
| 4,434,863 | 3/1984 | Garrett | 267/162 |

FOREIGN PATENT DOCUMENTS

| | | | |
|---|---|---|---|
| 400517 | 8/1924 | Germany | 267/162 |

*Primary Examiner*—Robert J. Oberleitner
*Assistant Examiner*—Chris Schwartz
*Attorney, Agent, or Firm*—John S. Munday; Stephen G. Stanton; Munday and Stanton

[57] ABSTRACT

A spring plate for use in a multiple disk friction coupling device, wherein a spring plate is an elastic member formed generally in a dish-like shape; a driving face facing a mating member comprises a side face of an outer diameter end portion, a circular protruding face, and a slant face smoothly continuing to this protruding face. The axial section of the driving face is formed of straight lines and curves which continue. The spring plate, when pushed against the mating member by a piston, is elastically deformed, pressing the driving face against a wide range of the mating member. Therefore the friction coupling member of the friction coupling device will never be locally heated to a high temperature, thus preventing heat distortion and non-uniform seizure of these members and accordingly smooth operation of the friction coupling device for a prolonged period of time.

3 Claims, 11 Drawing Sheets

SPRING PLATES OF MULTIPLE DISK FRICTION COUPLING DEVICE

BACKGROUND OF THE INVENTION

1. Field of the Invention

The present invention relates to a spring plate to be used in a multiple disk friction coupling device such as a multiple disk clutch or a braking mechanism.

2. Description of Related Art

A dish-like spring plate 34 is installed in a prior art multiple disk clutch mechanism 30 shown in FIG. 19 which is one example of a multiple disk friction coupling device.

The spring plate 34 is pushed at the inner diameter end portion 42 by a piston 31, and in turn a mating plate 32 is pushed by an outer diameter end portion 43. The mating plate 32 thus pushed is pressed against a friction plate 33 which makes a mutual rotating motion, to thereby transmit a torque.

Since the spring plate 34 has an appropriate elasticity, a friction coupling pressure caused by the advance of the piston is made to rise gradually by this elasticity during the initial period of friction coupling, that is, to moderate sudden torque transmission.

The spring plate 34 is formed in a shape of dish as shown in FIGS. 20(*a*) and 20(*b*), having a uniform thickness in a radial direction. A face 39 to be pressed against, and facing, the piston 21 and the driving face 40 acting on the mating plate 32 are arranged mutually in parallel with each other and flat.

On the outer periphery of the spring plate 34 are formed teeth 36 which are engaged by means of splines with a drum 35.

The spring plate 34, when pressed by the piston 31, is sandwiched between the piston 31 and the mating plate 32, being elastically deformed from a dish-like shape to a nearly flat shape. Since the driven face 39 and driving face 40 of the spring plate 34 are mutually parallel and flat, the position of contact of the spring plate 34 with the piston 31 and the mating plate 32 hardly varies. That is, in FIG. 20(*a*), an inner diameter end portion 42 is in constant contact at the left corner with the piston 31, while an outer diameter end portion 43 is in constant contact at the right corner with the mating plate 32.

The spring plate 34 pressed by the piston 31 locally pushes with the right corner of the outer diameter end portion 43 the outer diameter end portion of the mating plate 32. Therefore, the mating plate 32 and friction material 37 of the friction plate 33 are mutually pressed firmer both at the outer diameter side than at other portions.

Therefore, greater frictional heat is generated at the both outer diameter sides of the mating plate 32 and the friction material 37, resulting in a high temperature of these members. In addition, since the frictional heat occurs locally on the outer diameter side and therefore can not easily escape, resulting in a locally higher temperature in this area.

Therefore, the spring plate 34 has such an inherent disadvantage that because of the parallelism and flatness of the driven face 39 and the driving face 40, each mating plate 32 is liable to heat distortion and also the friction material 37 to non-uniform seizure.

The corners of the inner diameter end portion 42 and outer diameter end portion 43 of the spring plate 34 are provided with chambers 44 and 45 as shown in FIG. 21; accordingly the contact position of the spring plate 34 relative to the piston 31 and the mating plate 32 varies little by little. However, because the chambers 44 and 45 are about 10% or less in the area of the driven face 39 and the driving face 40, the position subjected to a high temperature will hardly change.

Some spring plates have no tooth on the outer periphery as shown in FIGS. 22(*a*) and 22(*b*).

In the case of this spring plate 47 also, the driven face 46 and the driving face 49 are mutually parallel and flat, and the outer diameter end portion of the mating plate is locally pushed by the right corner of the outer diameter end portion 48; therefore the mating plate is liable to heat distortion and besides the friction material is easily subjected to ununiform seizure.

In the meantime the spring plate 54 installed in a multiple disk clutch mechanism 50 shown in FIG. 23 is pressed at an outer diameter end portion 55 by a piston 51 and in turn a mating plate (mating member) 52 is pressed by the inner diameter end portion 56.

In this spring plate 54 also both the inner diameter end portion of the mating plate 52 and the inner diameter end portion of friction material 57 of the friction plate (mating member) 53 reach a high temperature, easily causing heat distortion of the mating plate 52 and non-uniform seizure of the friction material 57.

The spring plates 34 and 54 and the mating plates 32 and 52 are engaged by means of splines with the drums 35 and 58 to thereby rotate together with the drums 35 and 58, and therefore will not mutually make a relative rotating motion. The spring plate 47 shown in FIG. 22 is provided with no tooth for spline engagement; however, since the piston and the mating plate rotate together as a unit with the drum, the spring plate 47 also will hardly make a relative rotating motion with the mating plate.

Consequently there will never occur any frictional heat between the spring plates 34, 47 and 54 and the mating plates.

Furthermore, the spring plates 34, 47 and 54 have such a problem also when assembled in an unillustrated multi-disk brake mechanism as the occurrence of non-uniform seizure and heat distortion of the mating member.

SUMMARY OF THE INVENTION

To solve the above-described problems, the present invention has an object to provide a generally dish-like spring plate for use in a multiple disk friction coupling device, in which the axial section of the driving face in relation to the mating member is composed of a multi-stage linear line, multi-stage curve, simple curve, or a combination of these lines.

When the spring plate of the present invention is pressed by the piston, either one of the inner and outer diameter end portions presses with the side face the mating member. The spring plate of the present invention is elastically deformed as it is pressed by the piston, pressing the mating member by an intermediate portion between the inner diameter end portion and the outer diameter end portion.

In the case of the spring plate of claim 2, when the spring plate is pushed by the piston, the intermediate portion between the outer diameter end portion and the inner diameter end portion of the mating member is pressed by the most protruding radially intermediate portion. The spring plate in this case is subjected to elastic deformation when pushed by the piston, pressing in turn the mating member also by a portion close to the inner diameter end portion and the outer diameter end portion.

Therefore, when pressed by the piston against the mating member, the spring plate of the present invention being elastically deformed presses the mating member with a dispersed force while increasing the driving face area with respect to the mating member, thus operating the multiple disk friction coupling device.

In the multiple disk friction coupling device, the pressure to be applied to the friction coupling faces of a member to be mutually pressed becomes a dispersed pressure; therefore the friction coupling faces also will never be locally concentrically pressed.

Accordingly, there will never arise such a problem that some particular part of the friction coupling face will be locally heated to a high temperature if a frictional heat is generated in the friction coupling face. Moreover, the central part at which the pressure is exerted is an intermediate part in a radial direction of the friction coupling face. Therefore, the frictional heat can easily pass to escape in the radial direction of the friction coupling face and accordingly the friction coupling face will not be locally heated to a high temperature.

In the spring plate of the present invention, when installed in the multi-disk brake mechanism, the friction coupling faces of the friction coupling members will not locally rise to a high temperature.

DETAILED DESCRIPTION OF THE PREFERRED EMBODIMENTS

Preferred embodiments of spring plates according to the present invention will hereinafter be described with reference to FIGS. 1 to 18.

Figure 19:
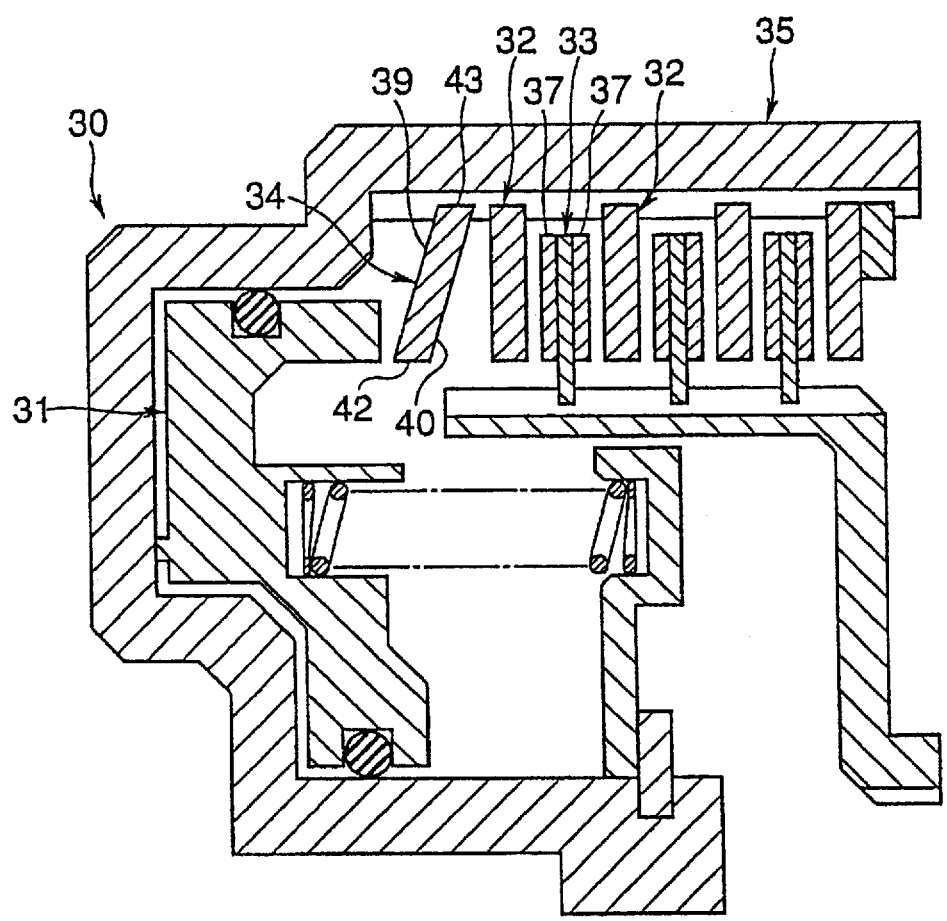
FIG. 19 is a sectional view taken along the axial direction of a multiple disk clutch provided with a prior art spring plate.

Spring plates 61, 161, 261, 361, 461, 561, 661 and 761 shown in FIGS. 1 to 8 are generally dish-like elastic members installed in a multiple disk clutch mechanism shown in FIG. 19.

The spring plates, like prior art spring plates, are pushed by a piston to press the mating plate (mating member) and a friction plate into mutual contact, that is, into friction coupling.

Figure 1A:
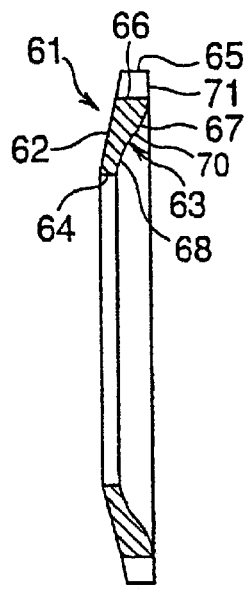
FIG. 1(a) is sectional view taken along the axial direction of a spring plate of a first embodiment of the present invention.
Figure 1B:
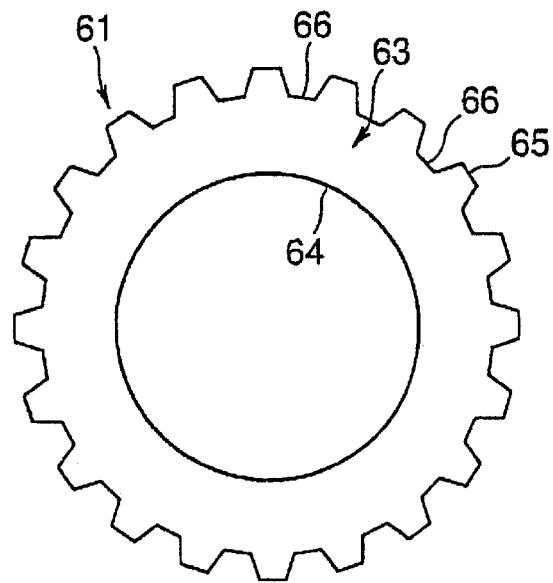
FIG. 1(b) is a partly sectional view taken along the axial direction of the spring plate of another embodiment of the present invention.

The spring plate 61 shown in FIG. 1 has teeth 66 on the outer diameter end portion 65 and is engaged by means of splines with a drum. The spring plates 161, 261, 361, 461, 561, 661 and 761 shown in FIGS. 2 to 8 are not provided with teeth on the outer diameter end portions 165, 265, 365, 465, 565 and 765.

The spring plates 61, 161, 261, 361, 461 and 561 shown in FIGS. 1 to 6 are formed generally in a dish-like shape.

Intermediate portions 70, 170, 270, 370, 470 and 570 between the inner diameter end portions 64, 164, 264, 364, 464 and 564 and the outer diameter end portions of the spring plates 61, 161, 261, 361, 461 and 561 are protruding on the mating plate side.

The driven face 62, 162, 262 and 362 of the spring plates 61, 161, 261 and 361 shown in FIGS. 1 to 4 are flat as the prior art spring plate 34 shown in FIG. 19. The driven face is a face to be pushed by the piston.

Driving faces 63, 163, 263 and 363 of each spring plate are protruding on the mating plate side. The driving face is a face which pushes the mating plate.

Therefore the spring plates 61, 161, 261 and 361 shown in FIGS. 1 to 4 have a uniform thickness (to be measured at right angles with the driven face).

The thickness of the spring plate 61 shown in FIG. 1 gradually increases as it goes from the inner diameter end portion 64 toward the outer diameter end portion 65.

The driving face 63 is comprised of a side face 71 of the outer diameter end portion 65, a circular projecting face 67, and a slant face 68 smoothly continued to the projecting face 67. The section of the slant face 68 may be either a curve or a straight line. That is, the straight line and curve in the section are usable in combination.

While being elastically deformed from a dish-like shape into a flat-plate shape when pushed by the piston, the spring plate 61 is pressed into contact with the mating plate in the order of the side face 71, projecting face 67 and slant face 68 of the outer diameter end portion 65, thereby frictionally coupling the mating plate with the friction plate.

Figure 2A:
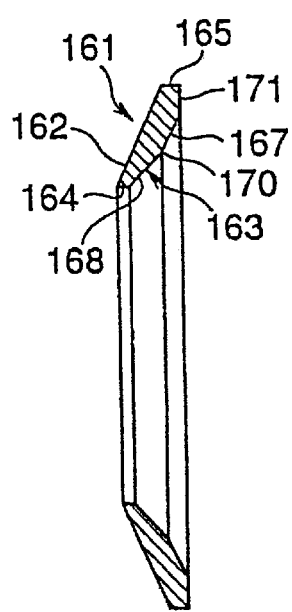
FIG. 2(a) is a sectional view taken along the axial direction of a spring plate of another embodiment of the present invention.
Figure 2B:
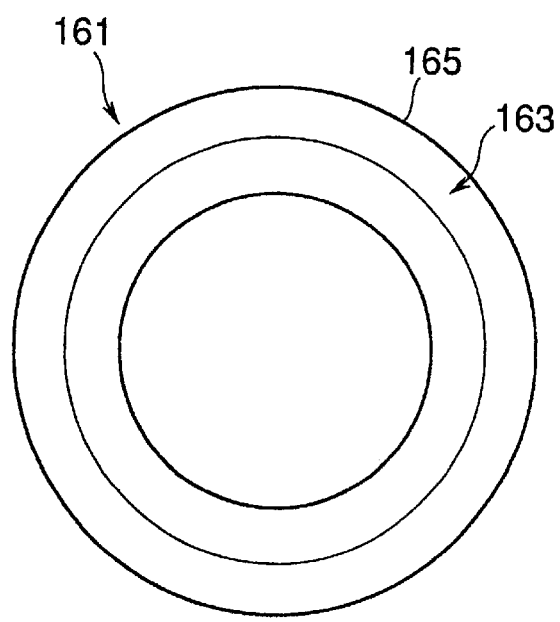
FIG. 2(b) is a right side view of FIG. 2(b)

The driving face 163 of the spring plate 161 shown in FIG. 2 is composed of a side face 171 of the outer diameter end portion 165, a slant face 167 having a sharp angle of inclination with respect to the axial center of the spring plate 161, and a slant face 168 having a gentle angle of inclination so that the section will form a multi-stage straight line. The "multi-stage" straight line is meant by a continuous straight line with varied inclinations.

While being elastically deformed from a dish-like shape into a flat-plate shape when pushed by the piston, the spring plate 161 is pressed into contact with the mating plate in the order of the side face 171, sharp slant face 167, and gentle slant face 168 of the outer diameter end portion 165, thereby frictionally coupling the mating plate with the friction plate.

Figure 3:
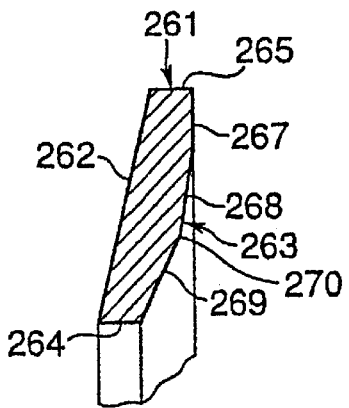
FIG. 3 is a partly sectional view taken along the axial direction of the spring plate of another embodiment of the present invention.

The intermediate portion 270 of the spring plate 261 shown in FIG. 3 is formed thick of an inner diameter end portion 264 and an outer diameter end portion 265.

The driving face 263 comprises a face 267 nearly perpendicular to the axial center of the spring plate 261, a slant face 268 of sharp inclination, and a slant face 269 of gentle inclination, thereby forming a section of a multi-stage straight line.

The spring plate 261, when pushed by the piston, is pressed against the mating plate in the order of a perpendicular face 267, a sharp slant face 268 and a gentle slant face 269 while being elastically deformed from a dish-like shape into a flat-plate shape, thus frictionally coupling the mating plate with the friction plate.

Figure 4:
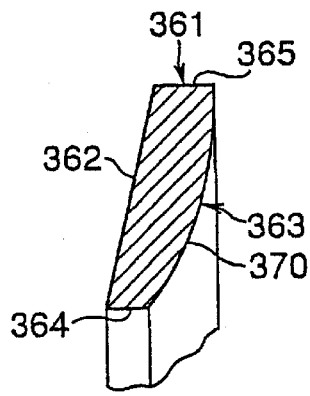
FIG. 4 is a partly sectional view taken along the axial direction of the spring plate of another embodiment of the present invention.

Next, the axial section of the driving face 363 of the spring plate 361 shown in FIG. 4 is formed in a circular shape protruding to the mating plate side.

The spring plate 361, when pushed by the piston, is pressed against the mating plate, from the outer diameter end portion 365 to the inner diameter end portion 364, while being elastically deformed from a dish-like shape into a flat-plate shape, thus frictionally coupling the mating plate with the friction plate.

Figure 5:
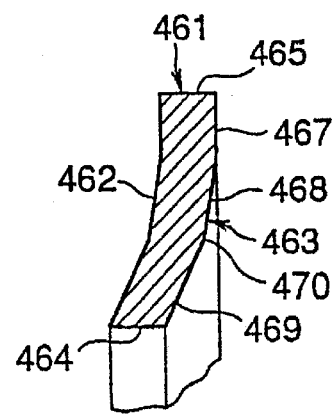
FIG. 5 is a partly sectional view taken along the axial direction of the spring plate of another embodiment of the present invention.
Figure 6:
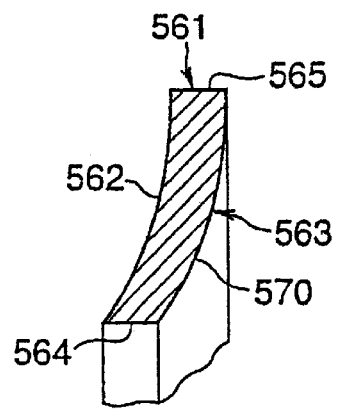
FIG. 6 is a partly sectional view taken along the axial direction of the spring plate of another embodiment of the present invention.

The spring plates 461 and 561 shown in FIGS. 5 and 6 are nearly uniform in thickness. Accordingly the spring plates 461 and 561 can more easily be manufactured by a pressing machine than the spring plates shown in FIGS. 1 to 4.

The driven face 462 of the spring plate 461 shown in FIG. 5 is not straight but is recessed.

A driving face 463 is comprised of a face 467 nearly perpendicular to the axial center of the spring plate 461, a slant face 468 of sharp inclination, and a slant face 469 of gentle inclination, thereby forming a section of a multi-stage straight line.

The spring plate 461, when pushed by the piston, is pressed against the mating plate in the order of a perpendicular face 467, a sharp slant face 468 and a gentle slant face 469 while being elastically deformed from a dish-like shape into a flat-plate shape, thus frictionally coupling the mating plate with the friction plate.

Next, the driven face 562 of the spring plate 561 shown in FIG. 6 is recessed to form a curved surface.

The axial section of the driving face 563 is formed in a circular shape protruding to the mating plate side.

The spring plate 561, when pushed by the piston, is pressed against the mating plate, from the side face of the outer diameter end portion 565 to the side face of the inner diameter end portion 564, while being elastically deformed from a dish-like shape into a flat-plate shape, thus frictionally coupling the mating plate with the friction plate.

Figure 7:
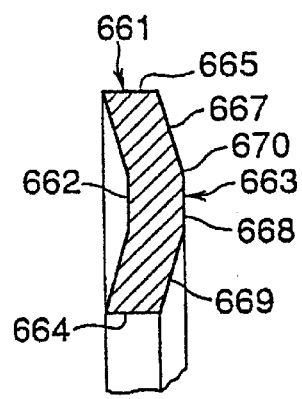
FIG. 7 is a partly sectional view taken along the axial direction of the spring plate of another embodiment of the present invention.
Figure 8:
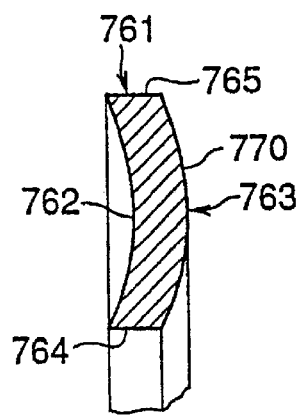
FIG. 8 is a partly sectional view taken along the axial direction of the spring plate of another embodiment of the present invention.

Intermediate portions 670 and 770 between the inner end portions 664 and 764 and the outer diameter end portions 665 and 765 in the spring plates 661 and 761 shown in FIGS. 7 and 8 are protruding toward the mating plate side over either of the inner and outer end portions.

The driven faces 662 and 762 of the spring plates 661 and 761 are recessed, forming a multi-stage straight line or a curve.

Furthermore, the thickness of the spring plates 661 and 761 is nearly uniform. Therefore the spring plates can more easily be manufactured by a pressing machine than the spring plates shown in FIGS. 1 to 4.

The driving face 663 of the spring plate 661 shown in FIG. 7 is composed of three straight lines 667, 668 and 669 in the sectional view. Of these three flat faces thus formed, the intermediate flat face indicated by reference numeral 668 is in the closest position to the mating plate.

The spring plate 661, when pushed by the piston, is pressed against the mating plate in order of a flat face indicated by reference numeral 668 and two flat faces indicated by reference numerals 667 and 669, while being elastically deformed into a flat-plate shape, thus frictionally coupling the mating plate with the friction plate.

The axial section of a driving face 763 of the spring plate 761 shown in FIG. 8 is formed in a circular shape protruding to the mating plate side.

The spring plate 761, when pushed by the piston, is pressed against the mating plate by the vicinity of an outer diameter end portion 765 and an inner diameter end portion 764 after an intermediate portion 770 in a radial direction of a driving face 763 is pressed against the mating plate, while being elastically deformed into a flat-plate shape, thus frictionally coupling the mating plate with the friction plate.

Figure 23:
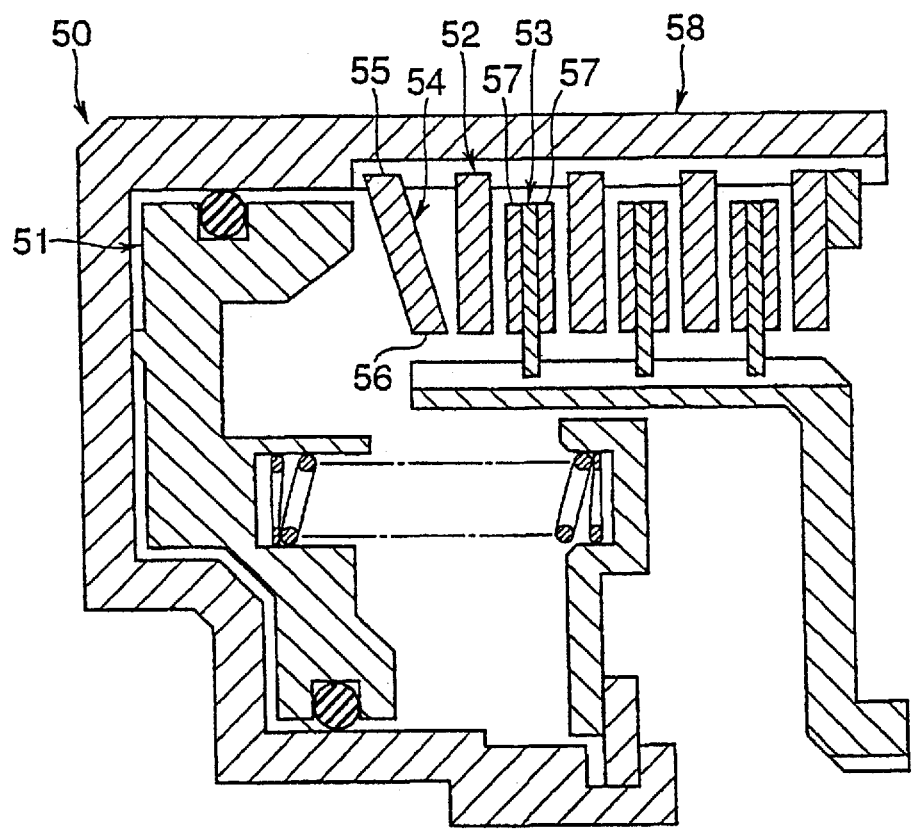
FIG. 23 is a sectional view taken along the axial direction of a multiple disk clutch provided with the prior art spring plate.

Next, the spring plates 81, 181, 281, 381, 481 and 581 shown in FIGS. 9 to 14 are dish-like elastic members to be installed in the multiple disk clutch mechanism of FIG. 23.

These spring plates, like prior art spring plates, are pushed by the piston into mutual contact for friction coupling between the mating plates and the friction plates.

The spring plates 81, 181, 281 and 381 shown in FIGS. 9 to 12 are formed generally in a dish-like shape.

Intermediate portions 90, 190, 290 and 390 between the inner diameter end portions 84, 184, 284 and 384 and the outer diameter end portions 85, 185, 285 and 385 in these spring plates 81, 181, 281 and 381 protrude out toward the mating plate side.

Figure 9:
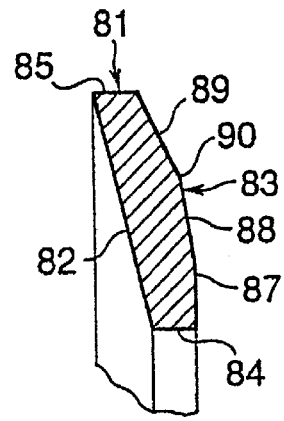
FIG. 9 is a partly sectional view taken along the axial direction of the spring plate of another embodiment of the present invention.
Figure 10:
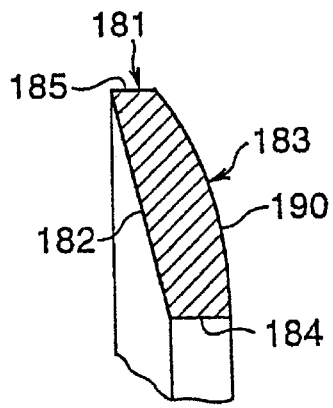
FIG. 10 is a partly sectional view taken along the axial direction of the spring plate of another embodiment of the present invention.

Driven faces 82 and 182 of the spring plates 81 and 181 shown in FIGS. 9 and 10 are flat similarly to the prior art spring plates 54 shown in FIG. 23. The driven faces are faces to be pushed by the piston. The driving faces 83 and 183 of the spring plates 81 and 181 protrude out toward the mating plate side. The driving face is a face by which the mating plates is pressed.

Therefore the thickness of the spring plates 81 and 181 shown in FIGS. 9 and 10 is ununiform.

The intermediate portion 90 of the spring plate 81 shown in FIG. 9 is formed thicker than the inner diameter end portion 84 and the outer diameter end portion 85.

The driving face 83 is composed of face 87 perpendicular to the axial center of the spring plate 81, a slant face 88 of sharp inclination, and a slant face 89 of gentle inclination which form a section of multi-stage straight lines.

The spring plate 81, when pushed by the piston, is pressed against the mating plate in the order of a perpendicular face 87, a sharp slant face 88 and a gentle slant face 89 while being elastically deformed from a dish-like shape into a flat-plate shape, thus frictionally coupling the mating plate with the friction plate.

The intermediate portion 190 of the spring plate 181 shown in FIG. 10 is formed thicker than the inner diameter end portion 184 and the outer diameter end portion 185.

The axial section of the driving face 183 is formed in a circular shape protruding to the mating plate side.

The spring plate 181, when pushed by the piston, is pressed against the mating plate, from the inner diameter end portion 184 to the outer diameter end portion 185 side, while being elastically deformed from a dish-like shape into a flat-plate shape, thus frictionally coupling the mating plate with the friction plate.

Figure 11:
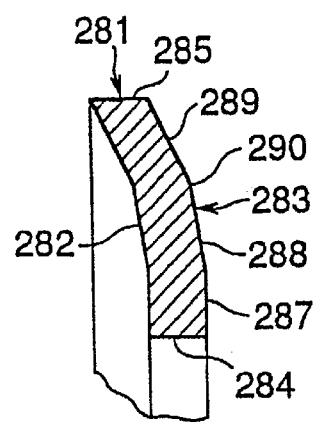
FIG. 11 is a partly sectional view taken along the axial direction of the spring plate of another embodiment of the present invention.
Figure 12:
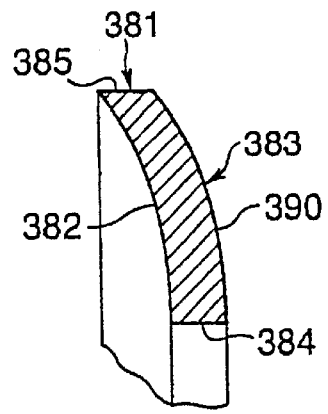
FIG. 12 is a partly sectional view taken along the axial direction of the spring plate of another embodiment of the present invention.

The thickness of the spring plates 281 and 381 shown in FIGS. 11 and 12 is nearly uniform. The spring plates 281 and 381, therefore, can more easily be manufactured by a pressing machine than the spring plates shown in FIGS. 1 to 4.

The driven faces 282 and 382 of the spring plates 281 and 381 shown in FIGS. 11 and 12 are recessed.

The driving face 283 of the spring plate 281 shown in FIG. 11 is composed of a face 287 nearly perpendicular to the axial center of the spring plate 281, a slant face 288 of sharp inclination, and a slant face 289 of gentle inclination, thereby forming a section having multi-stage straight lines.

The spring plate 281, when pushed by the piston, is pressed against the mating plate in the order of a perpendicular face 287, a sharp slant face 288 and a gentle slant face 289 while being elastically deformed from a dish-like shape into a flat-plate shape, thus frictionally coupling the mating plate with the friction plate.

Next, the radial section of the driving face 383 of the spring plate 381 shown in FIG. 12 is formed in a circular shape, protruding to the mating plate side.

The spring plate 381, when pushed by the piston, is pressed against the mating plate, from the inner diameter end portion 384 to the outer diameter end portion 385 side, while being elastically deformed from a dish-like shape into a flat-plate shape, thus frictionally coupling the mating plate with the friction plate.

Figure 13:
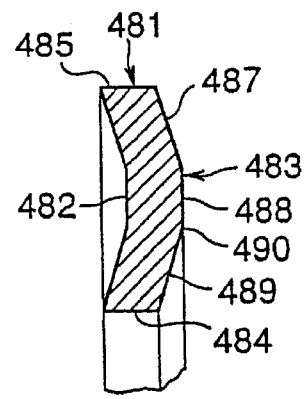
FIG. 13 is a partly sectional view taken along the axial direction of the spring plate of another embodiment of the present invention.
Figure 14:
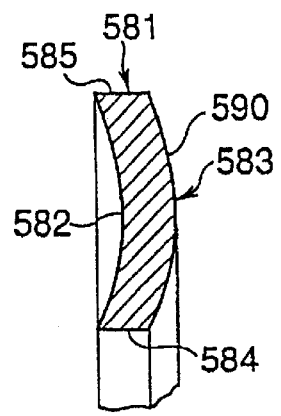
FIG. 14 is a partly sectional view taken along the axial direction of the spring plate of another embodiment of the present invention.

The thickness of the spring plates 481 and 581 shown in FIGS. 13 and 14 also is nearly uniform. Therefore the spring plates 481 and 581 also can more easily be manufactured by a pressing machine than the spring plates shown in FIGS. 1 to 4.

The intermediate portions 490 and 590 between the inner diameter end portions 484 and 584 and the outer diameter end portions 485 and 585 in the spring plates 481 and 581 protrude out over either of the inner and outer diameter end portions toward the mating plate side.

The driven faces 482 and 582 of the spring plates 481 and 581 are recessed.

The driving face 483 of the spring plate 481 shown in FIG. 13 comprises three flat faces 487, 488 and 489, whereby a section of multi-stage straight lines is formed. Of these three flat faces, the flat face indicated by reference numeral 488 is in the closest position to the mating plate.

The spring plate 481, when pushed by the piston, is pressed against the mating plate, in the order of a flat face 488 and two flat faces 487 and 489, while being elastically deformed into a flat-plate shape, thus frictionally coupling the mating plate with the friction plate.

The axial section of the driving face 583 of the spring plate 581 shown in FIG. 14 is formed in a circular shape, protruding out to the mating plate side.

The spring plate 581, when pushed by the piston, is pressed against the mating plate also at the vicinity of an outer diameter end portion 585 and an inner diameter end portion 584 after an intermediate portion 590 in a radial direction of a driving face 583 is pressed against the mating plate, while being elastically deformed into a flat-plate shape, thus frictionally coupling the mating plate with the friction plate.

In any of the spring plates shown in FIGS. 1 to 4, the contact surface area of the driving faces 63, 163, 263, 363, 463, 563, 663, 763, 83, 183, 283, 383, 483 and 583 facing the mating plate increases in the radial direction of the spring plate with an increase in the pressure of the piston. Also the center of the pressure of the spring plate to the mating plate moves radially.

The pressure of the spring plate, therefore, is applied through a wide range of the mating plate, and will never be locally concentrated.

A large part of frictional heat caused by friction coupling between the mating plate and the friction plate is produced and dispersed widely in the intermediate portion of the spring plate.

Therefore the mating plate and the friction plate will not locally become high in temperature, and accordingly heat distortion is hard to occur in the mating plate and furthermore non-uniform seizure becomes also hard to occur in the friction material.

Figure 15:
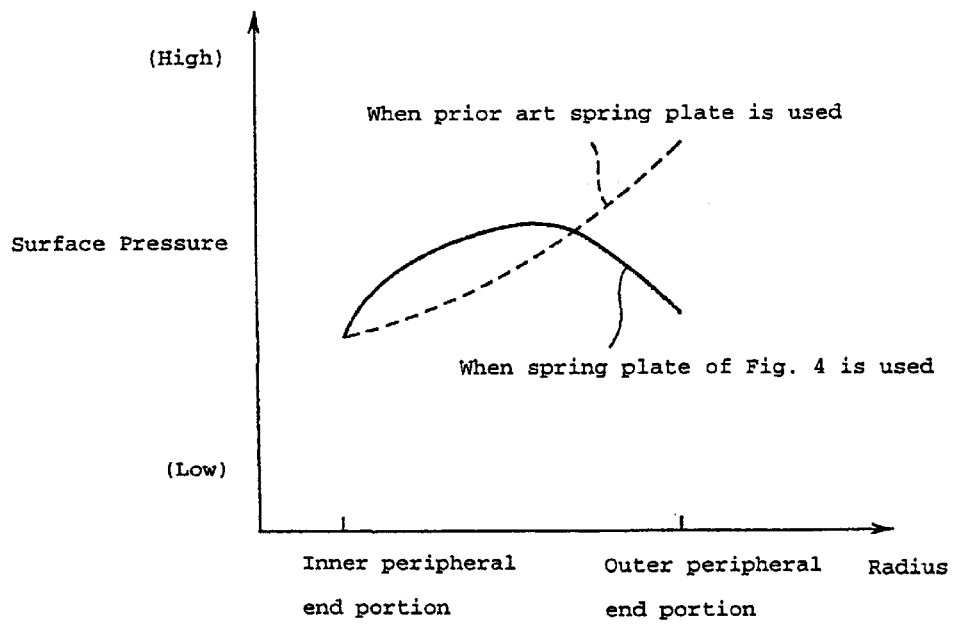
FIG. 15 is a graph showing a result of measurements of pressure applied to the friction coupling faces of a mating plate and a friction plate when a prior art spring plate shown in FIG. 20 and the spring plate shown in FIG. 4 are in use.
Figure 20A:
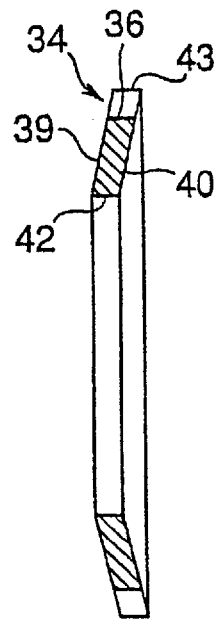
FIG. 20(a) is a sectional view taken along the axial direction of the prior art spring plate.
Figure 20B:
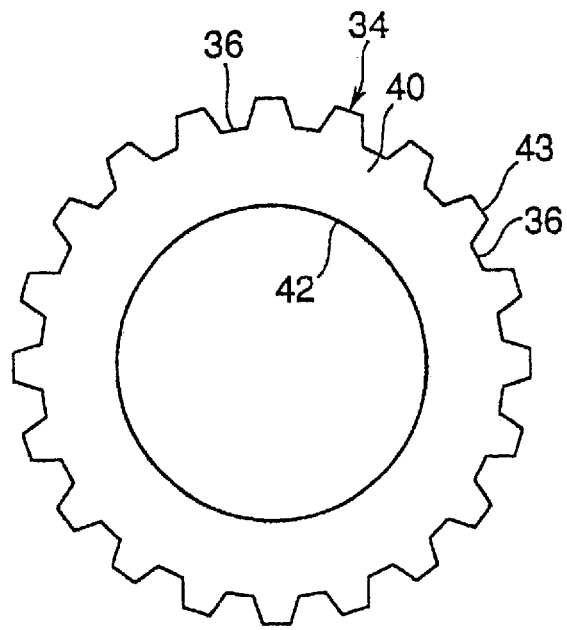
FIG. 20(b) is a right side view of FIG. 20(a)
Figure 21:
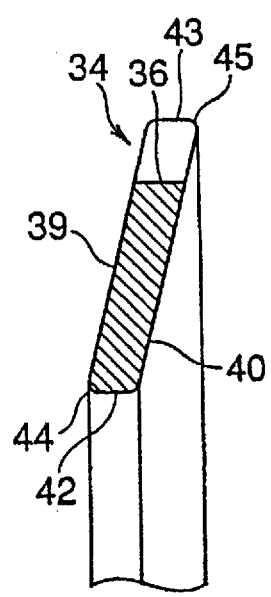
FIG. 21 is an enlarged, partly sectional view taken along the axial direction of the spring plate of FIG. 20(a)
Figure 22A:
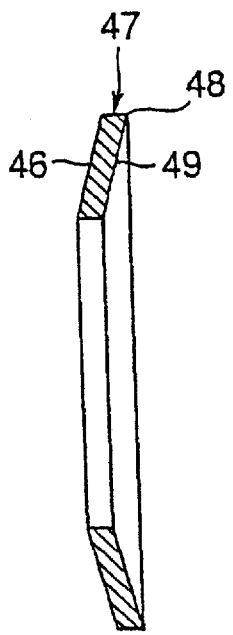
FIG. 22(a) is a sectional view taken along the axial direction of the prior art spring plate.
Figure 22B:
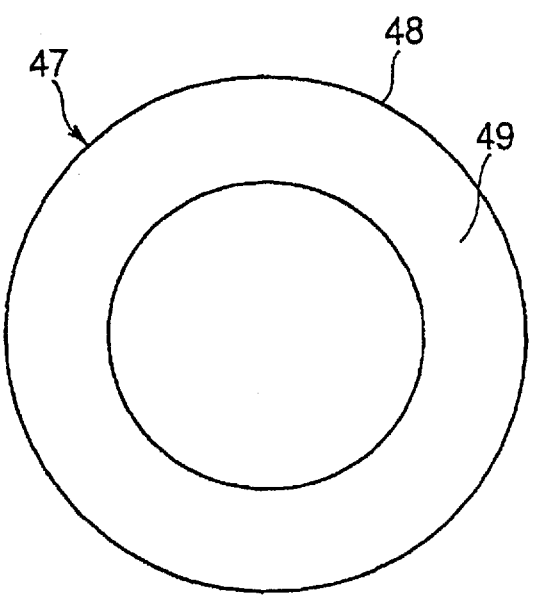
FIG. 22(b) is a right side view of FIG. 22(a)

FIG. 15 gives a graph showing a result of measurements of a pressure on the friction coupling faces of the mating plate and the friction plate when the prior art spring plate 34 shown in FIG. 20 and the spring plate 361 of the present invention shown in FIG. 4 are used.

It is clear from FIG. 15 that the pressure on the friction coupling faces reaches the maximum value at the outer peripheral end portion when the prior art spring plate is used and at the intermediate portion in the radial direction when the spring plate of the present invention shown in FIG. 4 is used.

Figure 16:
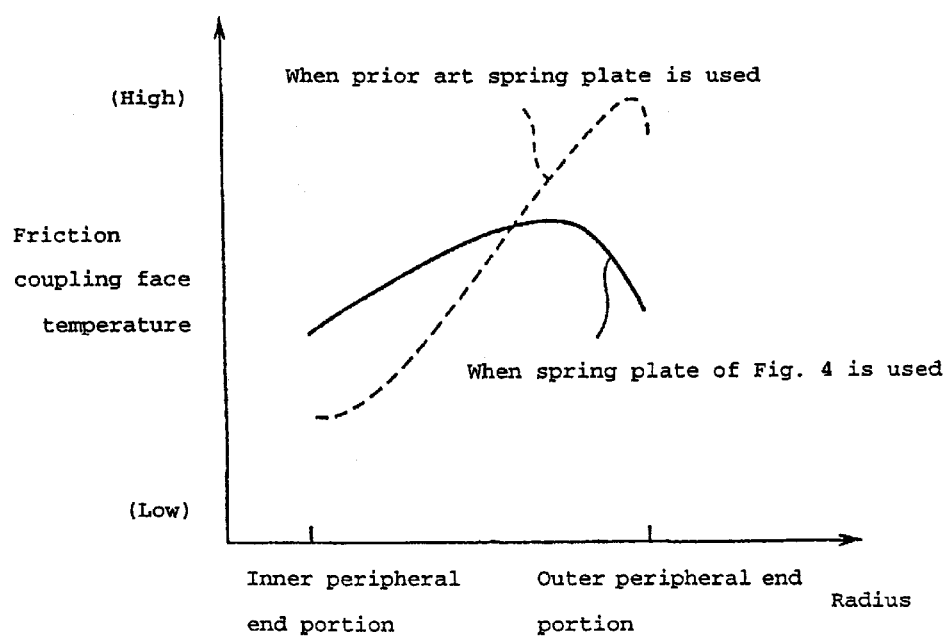
FIG. 16 is a graph showing a result of measurements of temperature in the friction coupling faces of a mating plate and a friction plate when a prior art spring plate shown in FIG. 20 and the spring plate shown in FIG. 4 are in use.

FIG. 16 gives a graph showing a result of measurements of temperature in the friction coupling faces of the mating plate and the friction plate when the prior art spring plate 34 shown in FIG. 20 and the spring plate 361 of the present invention shown in FIG. 4 are used.

It is understood from FIG. 16 that the temperature in the friction coupling faces reaches the maximum value at the outer peripheral end portion of the mating plate and the friction plate when the prior art spring plate is used and at the intermediate portion in the radial direction when the spring plate of the present invention shown in FIG. 4 is used.

Figure 17:
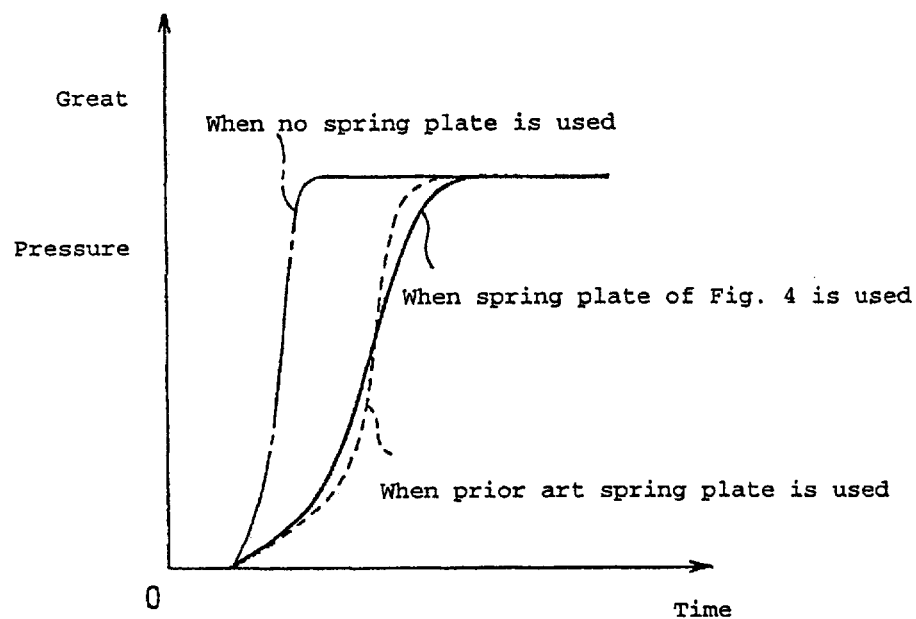
FIG. 17 is a graph showing a result of measurements of pressure the mating plate receives from each spring plate when the spring plate is not in use, but when the prior art spring plate shown in FIG. 20 is in use, and when the spring plate shown in FIG. 4 is in use.

Furthermore FIG. 17 is a graph showing a result of measurements of pressure which the mating plate receives from the spring plate, with the lapse of time, when no spring plate is used, when the prior art spring plate 34 shown in FIG. 20 is used, and when the spring plate 361 of the present invention shown in FIG. 4 is used.

From FIG. 17 it becomes clear that when the spring plate of the present invention shown in FIG. 4 is used, the pressure gradually increases with the lapse of time.

That is, the spring plate 361 shown in FIG. 4 has such a superior characteristic that sudden torque transmission which is likely to occur at the time of friction coupling between the mating plate and the friction plate can be eased more by the use of the spring plate of the present invention than by the use of no spring plate or by the use of the prior art spring plate.

Figure 18:
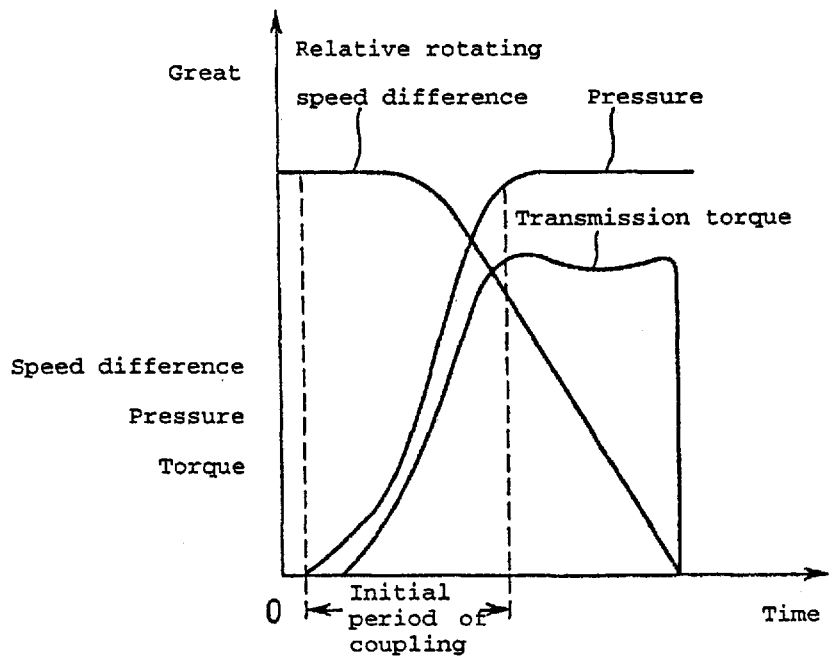
FIG. 18 is a graph showing a result of measurements of a difference of relative rotating speeds between the mating plate and the friction plate, a pressure of the mating plate for pushing the friction plate, and a torque to be transmitted between the mating plate and the friction plate, when the spring plate shown in FIG. 4 is used.

Finally, FIG. 18 is a graph showing a result of measurements of a difference in the relative rotating speed between the mating plate and the friction plate when the sprint plate shown in FIG. 4 is used, a pressure required by the mating plate to press the friction plate, and a transmission torque between the mating plate and the friction plate with the lapse of time. The frictional heat occurs chiefly in the period until the mating plate and the friction plate begin to rotate at the same speed.

In FIG. 18, the "initial period of coupling" is meant by the initial stage of friction coupling between the mating plate and the friction plate.

In other embodiments of spring plates than those of FIG. 4 also, the same characteristic as the spring plate shown in FIG. 4 is obtainable.

The spring plates of FIGS. 1 to 4 is similarly likely to cause heat distortion to occur in the mating plate and produces little non-uniform seizure in the friction material if installed in an unillustrated multi-disk brake mechanism.

The spring plate of the present invention, therefore, has such an advantage that the friction coupling members of a multiple disk friction coupling device will not be locally heated to a high temperature, thereby preventing heat distortion and non-uniform seizure and accordingly ensuring smooth operation for a prolonged period of time.

Furthermore, the spring plate of the present invention can mitigate sudden torque transmission during the initial period of friction coupling in relative rotating operation more than prior art ones.

Furthermore, as the spring plate stated in claim 3, the spring plate can easily be manufactured by, for instance, a pressing machine when spring plate thickness in a radial direction is nearly uniform.

What is claimed is:

1. In a multiple disk friction coupling device having means for application of pressure to engage said device, a spring plate generally formed in a dish-like shape for receiving said pressure to thereby transmit a torque and a mating member for receiving said torque, the improvement comprising:

a deformable spring plate having a driving face with an axial section composed of a face selected from the group consisting of multi-stage straight lines, multi-stage curved lines, simple curved lines or combinations of these lines, whereby force applied by said means for application of pressure causes said spring plates to elastically deform upon engagement with said mating member to thereby maximize contact there between.

2. A spring plate according to claim 1, wherein an intermediate portion in a radial direction of said spring plate protrudes more toward a mating member than either of the inner and outer ends of the spring plate in the radial direction.

3. A spring plate according to claim 1 or 2, wherein spring plate thickness in the radial direction is nearly uniform.

* * * * *